United States Patent
Albertsson et al.

(10) Patent No.: US 8,545,954 B2
(45) Date of Patent: Oct. 1, 2013

(54) BARRIER LAYER FOR A PACKAGING LAMINATE AND PACKAGING LAMINATE COMPRISING SUCH BARRIER LAYER

(75) Inventors: Ann-Christine Albertsson, Saltsjöbaden (SE); Ulrica Edlund, Tyresö (SE)

(73) Assignee: Tetra Laval Holdings & Finance SA, Pully (CH)

( * ) Notice: Subject to any disclaimer, the term of this patent is extended or adjusted under 35 U.S.C. 154(b) by 0 days.

(21) Appl. No.: 13/378,212

(22) PCT Filed: Jul. 6, 2010

(86) PCT No.: PCT/SE2010/050787
§ 371 (c)(1),
(2), (4) Date: Dec. 14, 2011

(87) PCT Pub. No.: WO2011/005181
PCT Pub. Date: Jan. 13, 2011

(65) Prior Publication Data
US 2012/0094047 A1    Apr. 19, 2012

(30) Foreign Application Priority Data
Jul. 7, 2009   (SE) ........................................ 0900940

(51) Int. Cl.
*B29D 22/00* (2006.01)
(52) U.S. Cl.
USPC ........................................... 428/36.5; 536/41
(58) Field of Classification Search
USPC ........................................ 428/36.6; 536/41
See application file for complete search history.

(56) References Cited

U.S. PATENT DOCUMENTS

| 2009/0221812 | A1* | 9/2009 | Ankerfors et al. | 536/56 |
| 2011/0028672 | A1* | 2/2011 | Dahlman et al. | 527/103 |
| 2012/0094047 | A1* | 4/2012 | Albertson et al. | 428/36.6 |

FOREIGN PATENT DOCUMENTS

| EP | 0 067 793 A1 | 6/2009 |
| RU | 2172283 C2 | 8/2001 |

(Continued)

OTHER PUBLICATIONS

International Search Report (PCT/ISA/210) issued on Oct. 20, 2010, by Swedish Patent Office as the International Searching Authority for International Application No. PCT/SE2010/050787.

(Continued)

*Primary Examiner* — N. Edwards
(74) *Attorney, Agent, or Firm* — Buchanan Ingersoll & Rooney PC

(57) ABSTRACT

The present invention relates to a barrier layer and a packaging laminate comprising a barrier layer and a method to produce a barrier layer. The barrier layer is manufactured of a cellulose-based hydrolysate. The barrier layer comprises lignin and oligo- or poly-saccharides, where the lignin and oligo- or polysaccharides are at least partly covalently bonded to each other in a matrix, and at least one co-component. The co-component is bonded to the lignin and oligo- or polysaccharides by means of primary and/or secondary bonds. In addition, the invention relates to a package made of the packaging laminate.

14 Claims, 1 Drawing Sheet

(56) References Cited

FOREIGN PATENT DOCUMENTS

| | | | |
|---|---|---|---|
| RU | 2236943 C2 | | 9/2004 |
| WO | WO 97/14629 A1 | | 4/1997 |
| WO | WO 97/16312 A1 | | 5/1997 |
| WO | WO 97/23390 A1 | | 7/1997 |
| WO | WO 97/47702 A1 | | 12/1997 |
| WO | WO 01/17774 A1 | | 3/2001 |
| WO | WO2005/080678 | * | 9/2005 |
| WO | WO2005/124020 | * | 12/2005 |
| WO | WO 2007/120091 A1 | | 10/2007 |
| WO | WO 2008/103123 A2 | | 8/2008 |
| WO | WO 2009/068525 A1 | | 6/2009 |

OTHER PUBLICATIONS

Written Opinion (PCT/ISA/237) issued on Oct. 20, 2010, by Swedish Patent Office as the International Searching Authority for International Application No. PCT/SE2010/050787.

An Office Action (Decision on Grant) issued by the Russian Patent Office, dated Mar. 22, 2013, in corresponding Russian Application No. 2012104029, and an English translation thereof.

* cited by examiner

BARRIER LAYER FOR A PACKAGING LAMINATE AND PACKAGING LAMINATE COMPRISING SUCH BARRIER LAYER

TECHNICAL FIELD

The present invention relates to a barrier layer for a packaging laminate, a packaging laminate comprising a barrier layer, a package comprising a packaging laminate and a method to produce a barrier layer for a packaging laminate. The barrier layer presents good gas barrier properties even at high air humidity.

BACKGROUND OF THE INVENTION

An important function of a package is to protect its content. It is therefore common that the packaging laminate, which forms the package, contains a gas impermeable barrier layer. An important application of this is within food industry, where one wishes to be able to protect foodstuff from oxygen. Penetrating oxygen may lead to oxidation of certain components of the foodstuff, which may deteriorate its quality and taste and in a worst case lead to that the foodstuff has to be discarded. This protection may be achieved by a gas impermeable or a gas resistant barrier layer. One may also conceive to prevent certain gases from leaking out of the package, e.g. if a foodstuff is packaged with a protective atmosphere such as $N_2$. The packaging material should preferably additionally be flexible and mechanically durable in order to be easy to handle and furthermore preferably not cost too much.

In the environmentally conscious society of today, there is an ambition to abandon non-renewable materials and instead change over to renewable materials. There is therefore a desire to exchange conventional barrier layers of for example metal foils or plastic based on non-renewable polymers, e.g. oil-based polymers, for more environmentally-friendly alternatives.

Packages may for example be produced of a packaging laminate by means of folding and sealing. In this case joints are formed, wherein the interior of the packaging laminate is exposed to the external environment and/or the content of the package.

Since the packages and thereby the barrier layer should function in all kinds of environments, e.g. regarding temperatures and air humidity, it is important that the barrier layer also copes with high air humidities. Previously known material based on renewable raw materials have often had undesired increased gas permeability at high air humidities, especially oxygen permeability, but in order to function well as a package, the material must be able to also cope with this.

If a cold package is placed in a warmer environment, e.g. a package taken out from a cold storage to an ordinary room environment, condensate may form on the outside of the package. There is then a risk that the condensate by way of the joints penetrates into the barrier layer and thereby damages the barrier layer. It is therefore desirable that the barrier layer functions well, even when it is exposed to humidity, in order to retain its gas protective function, since renewable barrier layers in general are of a hydrophilic nature and therefore sensitive to humidity. There are also examples of packages which are stored in iced water in order to for example manage cold storage without access to electricity. In this case, the joints are heavily exposed to the surrounding water, since the package is located in the water.

WO 2008103123 A2 by Gröndahl et al describes a polymeric film or coating comprising hemicellulose and at least one component selected from the group consisting of plasticizers, cellulose, and an oligomer or polymer. The polymeric film or coating further comprises at least one additive/reactant increasing the liquid/moisture resistance and mixed with and/or reacting with the hemicellulose and the at least one component before or in conjunction with the forming of the film or coating.

However, even if hemicellulose is commonly present in biomass, the biomass normally goes through a process in order to separate the hemicellulose, such that the hemicellulose thereafter can be used for forming the polymeric film or coating according to WO 2008103123 A2. As an example, it is mentioned on page 5, line 4, that xylan is separated by means of extraction with water and aqueous alkali. Such a separation process step takes time and costs money.

In PCT/EP2008/066148 by Dahlman et al, a method is described for utilizing a wood hydrolysate obtained from a hydrothermal treatment of wood material. The method comprises the steps of providing a wood material and treating it with an aqueous hydrothermal treatment, such that a wood hydrolysate and a wood residue is formed. The hydrolysate comprises oligo- and polysaccharides as a main component of dry matter. The method further comprises the step of separating the hydrolysate into a low molecular and a high molecular fraction. Embodiments disclose films and coatings made of the high molecular fraction.

SUMMARY OF THE INVENTION

At least some of the above disadvantages may be reduced by a barrier layer and a packaging laminate according to the present invention. According to one aspect of the invention there is provided a barrier layer for a packaging laminate and a packaging laminate with improved properties.

The packaging laminate comprises a barrier layer, which is manufactured of a cellulose-based hydrolysate. The barrier layer comprises lignin and oligo- or polysaccharides, where the lignin and oligo- or polysaccharides are at least partly covalently bonded to each other in a matrix, and at least one co-component. The matrix is preferably water insoluble. The co-component is bonded to the lignin and oligo- or polysaccharides by means of primary and/or secondary bonds.

By using a cellulose-based hydrolysate, it is possible to make a barrier layer based on renewable raw materials. The barrier layer in accordance with the invention functions well even at high air humidities, especially at high relative humidity expressed as % RH.

Since the barrier layer comprises both lignin and oligo- or polysaccharides, there is no need for an extra process step like the hemicellulose separation step mentioned in WO 2008103123 A2. Thereby time and cost may be saved.

The barrier exhibits an oxygen permeability of less than 50 $cm^3/m^2/24$ h, preferably less than 45 $cm^3/m^2/24$ h, most preferably less than 40 $cm^3/m^2/24$ h, measured according to ASTM D3985-95 at an air humidity of 80% RH, at 1 atm, i.e. the pressure of one atmosphere, and a thickness of less than 50 μm for the barrier layer.

With the barrier layer according to the invention suitable barrier properties are achieved already with thin layers of a film or a coating.

The cellulose-based hydrolysate can for example be based on wood. A suitable wood-based cellulose-based hydrolysate is wood hydrolysate. As wood hydrolysate can be attained from the process in conventional pulping industries, this results in that there is a good access to this raw material, which as well is renewable.

In an embodiment of the present invention a hydrolysate isolated from the process or waste water of a wood refining process, e.g. a pulping process, is utilized. As mentioned above, there is no need for an extra separation step in order to obtain highly purified hemicellulose, which would form the basis for the barrier layer according to prior art technology. The hydrolysate is separated from cellulose component, which e.g. is used for paper making, but still contains a fair amount of the native lignin-carbohydrate complexes, and thus covalent bonds that contribute to hindering diffusion of a gas, e.g. oxygen, through the matrix.

In an embodiment, the attained wood hydrolysate may be separated into different fractions, e.g. a high-molecular and a low-molecular fraction. An example of such a high-molecular fraction is a wood hydrolysate comprising, expressed as percentage of weight, >80% oligo- and polysaccharides, 1-20% lignin and 0.01 to 5% residues from said cellulose-based hydrolysate. Residues can be ash and monomers. Such a high-molecular fraction of a wood hydrolysate, which fraction itself constitutes a cellulose-based hydrolysate, is an adequate basis for manufacturing a barrier layer as described above. Alternatively, the attained wood hydrolysate may be used as it is, i.e. without any fractionation, comprising both high-molecular and low-molecular saccharides.

To enhance and get the proper balance of the network of interactions between the constituent molecules of the cellulose-based hydrolysate, one or more co-components are added. The nature of these co-components is carefully chosen so that they are renewable and bear functional groups, such that primary and/or secondary bonds between the wood hydrolysate and the co-component are purposely formed. It is these bonds which give the barrier layer its desired properties. The co-component is typically an oligomer or a polymer. A suitable co-component is a polysaccharide, e.g. chitosan, micro-fibrillated cellulose, and/or carboxymethylcellulose, i.e. CMC. The co-component may be coupled to the oligo- or polysaccharides with organic coupling reactions.

The barrier layer may further comprise a plasticizer. The plasticizer gives an opportunity to give the barrier layer desired mechanical properties, e.g. elasticity and flexibility. The plasticizer is typically low-molecular or oligomeric, e.g. oligomeric lipids and polyols.

The packaging laminate is intended as a packaging container for products being especially sensitive to oxygen. The packaging laminate comprises a base layer, a first outer layer on one side of the base layer and a second outer layer on the other side of the base layer, and a barrier layer adapted to serve as a gas barrier between the base layer and the first outer layer. The barrier layer comprises lignin and oligo- or polysaccharides, wherein the oligo- or polysaccharides are at least partly covalently bonded to each other in a matrix; and at least one co-component. The matrix is preferably essentially water insoluble. The co-component is bonded to the lignin and oligo- or polysaccharides by means of primary and/or secondary bonds.

The base layer provides mechanical stability to the package. The base layer may comprise a paper or cardboard layer. Thereby it is possible to make a whole package of renewable raw materials.

The outer layers are preferably liquid impermeable. They may comprise polyolefin providing a liquid impermeable layer.

In an aspect of the invention, the packaging laminate is utilized for making a package for oxygen sensitive products, especially foodstuff. The package is produced by folding and heat sealing of a sheet-shaped or web-shaped blank of a packaging laminate according to above.

In an aspect of the invention there is provided a method for manufacturing of a barrier layer. The barrier layer is manufactured with the steps:
providing a cellulose-based hydrolysate comprising lignin and oligo- or polysaccharides, wherein the lignin and oligo- or polysaccharides are at least partly covalently bonded to each other in a matrix; wherein the matrix preferably is essentially water insoluble;
adding at least one co-component;
bonding the at least one co-component by means of primary and/or secondary bonds to the lignin and oligo- or polysaccharides.

According to the above method, there is no need for an extra process step like the hemicellulose separation step mentioned in WO 2008103123 A2. Thereby time and cost may be saved.

In an embodiment, there may be an additional process step for fractionating the cellulose-based hydrolysate into different fractions, e.g. a high-molecular and a low-molecular fraction. However, this process step is by no means necessary, since the method according to this aspect of the invention also functions adequately without a fractionation step.

The co-component is preferably chosen such that the barrier layer exhibits a substantially low oxygen permeability at a high relative air humidity, for example an oxygen permeability of less than 50 $cm^3/m^2/24$ h, preferably less than 45 $cm^3/m^2/24$ h, most preferably less than 40 $cm^3/m^2/24$ h, measured according to ASTM D3985-95 at an air humidity of 80% RH and 1 atm and a thickness less than 50 μm.

The method for manufacturing the barrier layer may also comprise the additional step of evaluating the amount of lignin and oligo- or polysaccharides and/or the amount of and type of functional groups on the lignin and oligo- or polysaccharides in the provided cellulose-based hydrolysate and on the basis of the evaluation selecting an appropriate co-component. Evaluation may be done by quantitative or qualitative analysis.

The primary and/or secondary bonds may in an embodiment of the method be obtained by means of organic coupling reactions.

Further, a plasticizer may be added in an additional step in order to be able to influence the mechanical properties of the barrier layer.

The term layer herein refers to an essentially continuous layer of a material, such as a film or a coating.

BRIEF DESCRIPTION OF THE DRAWINGS

The present invention is in more detail described with reference to the enclosed figures, wherein.

DETAILED DESCRIPTION OF PREFERRED EMBODIMENTS

Figure 1:
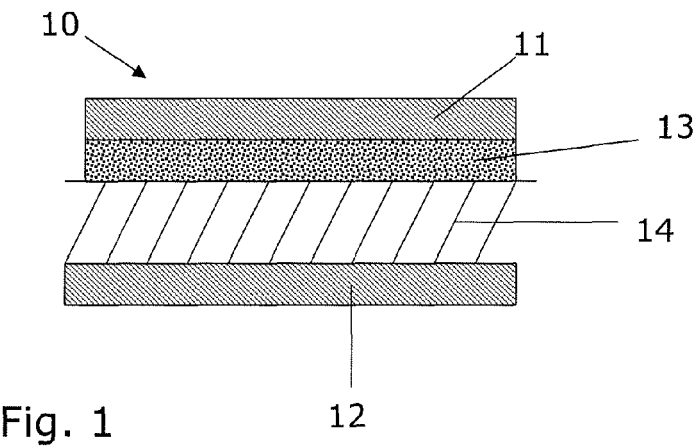
FIG. 1 illustrates a cross-section of a packaging laminate comprising a barrier layer according to the invention.

Below a barrier layer, a packaging laminate and a method for manufacturing a barrier layer in accordance with the present invention will be described in more detail, partly by means of FIG. 1. The packaging laminate 10 may be used to be folded and heat sealed to a package. The packaging laminate 10 exhibits a first liquid impermeable layer 11 intended to be facing and in direct contact with the packed product and a second liquid impermeable layer 12, intended to be facing and in direct contact with the surrounding air of the package. The packaging laminate also exhibits at least one barrier layer 13, in accordance with the present invention, and at least one base layer 14 located between the barrier layer 13 and the outer or second liquid impermeable layer 12.

The base layer 14 typically is of paper or cardboard. Suitable material for the liquid impermeable layer 11, 12 may be biodegradable materials such as films based on polylactic acid, pectin or the like. Alternatively, suitable materials may be polyolefins, e.g. LDPE, low-density polyethylene.

As an option, the packaging laminate may comprise additional layers and/or have the layers arranged in another order.

The barrier layer 13 may be used to prevent penetration of gases in both directions through the walls of a package. As an example, it may be mentioned that for a sensitive product packed in a protective atmosphere, where the protective atmosphere is in a gas phase within the package, e.g. $N_2$ it is desirable to prevent gas penetration into the package as well as gas migration out of the package. For certain products it is desirable to retain the aroma. Example of products suitable for this kind of packaging laminate are foodstuff, but may also be pharmaceutical products, sensitive electronics or mechanical equipment, such as clean-washed metal pieces which have been packed to prevent oxidation and corrosion.

Concerning foodstuff, it is often desirable to in particular keep out oxygen, because penetrating oxygen may cause oxidation, which destroys the quality and taste of the foodstuff and contributes to the degradation of the foodstuff. The foodstuff may be both in solid form, e.g. chips in a bag, or in liquid form. A large and important field of application of the barrier layer and packaging laminate according to the invention is in packages for liquid oxygen-sensitive foodstuffs such as milk, juice, syrup, mulled wine, wine, beer, dairy products such as cheese, yoghourt, etc., but also some oils.

A packaging laminate 10 according to the invention may be made of entirely renewable raw materials. With the proposed barrier layer 13 it is possible to avoid using barrier layers of for example metal foils or plastic based on non-renewable polymers. In addition, the barrier layer 13 exhibits advantages over conventional renewable barrier materials, which are made of pure solutions of polysaccharides or pure mixtures of polysaccharides. The inventors have realized the importance of utilizing a cellulose-based hydrolysate and preferably a wood hydrolysate from for example pulping, since these hydrolysates among other things contain lignin and important residue products, which are considered to be an important part of the forming of a barrier layer 13.

Pure solutions of polysaccharides or pure mixtures of polysaccharides lack a combination of lignin and oligo- or polysaccharides which form a basis for the invention. For example, in natural wood a substantial part of the lignin is covalent-bonded to various oligo- and polysaccharides. This means for example that polysaccharides, which taken one by one would be hydrophilic and water soluble, still may exist and persist in a non-water-soluble matrix with good barrier properties. A barrier layer according to the present invention utilizes the way in which the lignin binds to oligo- and polysaccharides in its natural state of wood. The said covalent bonds are typically α-ester, α-ether- or phenyl-glucoside bonds.

In practice this means that it is possible to reproduce those bonds, or create similar bonds, which exist between lignin and existing polysaccharides in the original cellulose-based material. This can be done by combining the functional groups of the oligo- and polysaccharides with appropriate functional groups on a preselected co-component, such that the functional groups can create primary and secondary bonds and thereby a good and tight barrier through which smaller molecules such as oxygen have difficulty to diffuse, even in an environment of high humidity such as 80% RH.

In normal pulp production processes and refining processes many of the covalent bonds between the lignin and the various oligo- and polysaccharides are broken up by means of heat, chemicals and mechanical influence. Different wood components are then removed from the cellulose fibres to obtain pulp fibres or another end product having as high cellulose content as possible.

The barrier layer according to the invention is instead based on an only partially upgraded mixture, wherein still a good proportion of the lignin-saccharide-complexes remains. Their remaining covalent bonds will contribute to preventing gas diffusion through the barrier layer. To enhance this effect and to get the right balance in the network between the constituent molecules, one or more co-components are added. These are selected such that the on the one hand are renewable, on the other hand have functional groups which may form primary and/or secondary bonds between the components of the hydrolysate and the co-components. It is these bonds which provide the barrier layer with its desired properties. It is possible to detect the covalent bonds in the lignin-saccharide complexes. Therefore, it is possible to select the co-component, such that the desired interactions between hydrolysate components and co-components occur.

With primary, covalent, bonds is referred to such bonds which are composed of shared pairs of electrons between the atoms comprised in the bond. With secondary bonds is referred to inter-atomic and inter-molecular interactions, attraction, of varying degree of strength, such as hydrogen bonds or London forces.

The term cellulose-based hydrolysate refers to a solution or slurry which has been produced by treating a cellulose-based material with an aqueous solution, which in itself may be neutral, acid or alkaline. It is possible to use a hydrolysate, which is a solution in the correct meaning by the definition of the word, i.e. thermodynamically fully miscible, down to a molecular level, composition of two components from originally two different phases. But often the hydrolysates in question are not fully soluble, but rather a slurry. The lignin-polysaccharide-complexes exist as clusters in the mixture and in addition there may be extractives and ash and other components which neither meet the thermodynamic requirements of solubility. In the description below, the term solution is used to describe both thermodynamically fully miscible solutions and the mixtures which are rather a slurry.

The cellulose-based material may be naturally occurring in nature, such as wood. Preferably wood hydrolysate can be used, but it is also possible to use other processes giving carbohydrate-rich but at the same time non-cellulose-rich fractions. The fraction may be a process water, a fractionation product or similar. This fraction may be at least partly upgraded to separate a part of the lignin and monomeric extractives such as ash and sugar. This upgraded fraction may contain oligo- or polysaccharides other than cellulose, typically hemicellulose, should contain lignin, and may also to some extent contain monomeric sugar and extractives. If the raw material for the hydrolysate lacks lignin or has less lignin than desired, lignin may be added as an external additive. A wood hydrolysate can be utilized both with and without upgrading.

Since it is desired that the barrier material also functions adequately at high relative air humidity it is not enough just to get a cohesive film, but this film should preferably contain bonds that are strong enough to hold together the mixture components so well that the possibility for relatively small molecules to diffuse through the material is made considerably more difficult. Examples of molecules that the barrier layer should obstruct are $O_2$ and $H_2O$ (g).

When choosing co-components, one should try to obtain a certain combination of the functional groups which with its chemistry may create the desired bonds, in particular enable the creation of secondary interactions with carbohydrate molecules in the hydrolysate component. Sometimes it is therefore appropriate, before adding the co-component, to evaluate the provided cellulose-based hydrolysate to determine parameters such as the contents of lignin and oligo- or polysaccharides and the amount and type of bonds between the lignin and the various oligo- and polysaccharides. The co-components are typically oligo- or polymeric components. A typical example is a polysaccharide which is selected to provide the desired bonds, e.g. chitosan. One can also conceive other renewable co-components, such as from the family of polyesters, e.g. oligolactide. Co-components which have been successfully tested include micro-fibrillated cellulose, carboxymethylcellulose, alginate, polylactic acid, L-lactic acid and D, L-lactic acid.

Suitably, the fraction comprising lignin and oligo- or polysaccharides is mixed with the co-component in an aqueous solution. Possibly, a plasticizer may be added. The aqueous solution is then used to produce polymer films and coatings.

The resulting polymer film or coating is very suitable to utilize as barrier material because of its low gas permeability.

Description of the Measurement Methods

Thickness

The thickness was calculated as the average of 10 measurements with a Mitutoyo micrometer.

Oxygen Permeability

The oxygen permeability was measured at a controlled relative humidity, 50% RH and 80% RH, with a Mocon Ox-Tran® 2/20-instrument from Modern Controls Inc., USA, equipped with a coulometric sensor. Measurements were performed according to ASTM method D3985-95 and the oxygen permeability was calculated as the oxygen trans-mission from a sample of specified thickness, measured with Mitutoyo-micrometer, and an area of 5 cm$^2$. Pressure was 1 atm, i.e. 1 atmospheric pressure. Each result is an average of two measurements given as (cm$^3$)/(m$^2$ 24 h), i.e. cubic centimetres per square meter and 24 hours. The samples were pre-conditioned for at least 60 hours in an environment with the same relative humidity as the one later used at the measurement. See Table 2 below for results.

Other Test Methods

Test methods for the composition of the wood hydrolysates are found in the document PCT/EP2008/066148. This document also describes how the degree of substitution with acetyl groups for the saccharides in the upgraded hydrolysates, $Ds_{AC}$, is determined. This document also describes how the molecular weight parameters are determined. See Table 1 below for results.

EXAMPLES

The following embodiments of the present invention includes the preparation of films and coating formulations based on water solutions containing any of various hydrolysates, each mixed with one or more co-components and optionally a plasticizer. The wood hydrolysates 1A-1D below were prepared to form a basis for films, see Examples 2A-2G, and coatings, see Examples 3A-3C.

Hydrolysate Preparation

Example 1A

A wood hydrolysate was prepared from spruce, *picea abies*, according to the method set forth in PCT/EP2008/066148. Spruce chips, with dry content 42%, were passed through a laboratory screen grid allowing 8 mm but not 7 mm and then added to a batch autoclave and subjected to steam at 110-120° C. for 45 min. Preheated water was flushed into the autoclave through a pressurized vessel to maintain a liquid-to-wood ratio of 6:1, given as volume-to-mass ratio, and the mixture was heated to 150° C. A representative heating time was 40 min, while the treatment time was 60 min. The total yield of wood components isolated in the hydrolysate was 6.8% with respect to dry matter.

In the next step, the hydrolysate was upgraded. A volume of 20 liters of the wood hydrolysate was up-graded by fractionation using membrane filtration, in this case ultrafiltration, employing a tangential flow filtration cartridge unit equipped with a regenerated cellulose membrane, PLAC Prepscale, Millipore, with a nominal cut-off of 1000 Da. The membrane filtration was performed to concentrate the retentate, i.e. the high molecular weight fraction, down to 2 liters. Consequently, the permeate, i.e. the low molecular weight fraction, constituted 18 liters. The high molecular weight fraction was purified further by diluting it with water to 10 liters and then again membrane filtering down to a volume of 2 liters, so called diafiltration. The yield of high molecular weight material thus obtained after membrane filtration and diafiltration varied between 1.3% and 7.6% calculated on basis of the wood chips employed for obtaining the hydrolysates. The composition is disclosed in Table 1 as 1A.

Example 1B

A wood hydrolysate was prepared from birch, *betula verrucosa*, according the method set forth in PCT/EP2008/066148. 1.0 kg of dried wood chips with a dry content of 90%, screened on a laboratory screen passing 8 mm but not 2 mm, was charged to a continuous liquid flow autoclave. 5.5 liters of hot water preheated to 165° C. was flushed into the autoclave from a pressurized vessel connected to the autoclave to give a liquid-to-wood ratio of 6:1, given as volume-to-mass ratio. The autoclave was kept at 165° C. for 30 minutes hydrothermal treatment of the wood material. Then about 4.5 liters of the treatment liquid was taken out during approximately 5 minutes and replaced by the corresponding volume preheated water. The about 165° C. hot wood hydrolysate liquid replaced, was collected in a second pressurized vessel connected to the autoclave. The treatment was then continued in the autoclave with the fresh hot water for an additional 30 minutes after which also this second wood hydrolysate was displaced into the second pressurized collection vessel. The total volume of the two combined wood hydrolysates was 10.2 liters and the pH was 3.5. The total yield of wood substances isolated with the hydrolysate corresponded to 21.2%, calculated on basis of the weight of the dry wood chips charged in the autoclave. The hydrolysate was upgraded according to the route described in Example 1A. The composition is disclosed in Table 1 below as 1B.

Example 1C

A wood hydrolysate was prepared from a mixture of pine and spruce wood chips in an industrial process for fibreboard production. The wood chips were treated by steam explosion.

The aqueous fibre suspension obtained and mixed with processing aids and performance chemicals, was subsequently applied onto the fibreboard machine to form the fibre web, and dewatered. This process water was collected directly after the dewatering step, prior to floatation. This hydrolysate was first subjected to centrifugation, 20 minutes to remove fibre residues and then fractionated by ultrafiltration and diafiltration using the same filter unit as described in Example 1A. The retentate was used for film and coating production as described in forthcoming examples. Optionally, the retentate can be further purified by solvent fractionation in ethanol. A high-molecular weight fraction may then be isolated comprising around 85% of oligo- and polysaccharides and only 3% of lignin (with respect to dry matter). However, herein the hydrolysate was used without purification by solvent fractionation. The composition is disclosed in Table 1 below as 10.

Example 1D

A wood hydrolysate was prepared from birch according a method set forth in WO 2007/120091 A1, Method for separating polymeric pentose from a liquid or slurry, by Dahlman O, Tomani P, Axegård P, Lundqvist F and Lindgren K. The hydrolysate was obtained from kraft black liquor in a dewatering step of the pulp after the initial step of cooking under alkaline conditions. The liquid phase was subjected to membrane filtration using a ceramic membrane with a cut-off of 20 kDa and then precipitated in methanol. The composition is disclosed in Table 1 below as 1D.

TABLE 1

Composition and weight average molecular weights of wood hydrolysates.

| | Composition, % with respect to dry matter | | | | | |
|---|---|---|---|---|---|---|
| Wood hydrolysate | Monosaccharides | Oligo- and polysaccharides | Lignin | Ash | $Ds_{AC}$ | $M_w$ (g/mol) |
| 1A | 1.7 | 89 | 9.3 | <0.1 | 0.5 | 4600 |
| 1B | 2.5 | 87.5 | 10 | <0.1 | 0.9 | 2400 |
| 1C | 32 | 55 | 13 | <0.1 | 0.5 | 6600 |
| 1D | <4 | ~44 | ~12 | 40 | n.a. | 10000-13000 |

After any of the processes described in Examples 1A-D, a hydrolysate containing oligo- and polysaccharides and lignin was obtained. Examples 1A and 1B represent upgraded wood hydrolysates, while Examples 10 and 1D were not upgraded. The hydrolysates were dried and used for the production of barrier films and coatings.

In each case, the hydrolysate was mixed with a co-component, typically a polysaccharide. The co-component for each example below was selected based on its ability to add adequate mechanical performance and film forming properties to the resulting mixture. The co-component was further chosen with respect to its ability of forming strong secondary bonds to the oligo- and polysaccharides in the hydrolysate. Blends were prepared from water solutions and utilized for the production of films or coatings. Optionally, a plasticizer can be used. Representative plasticizers include: oligomeric fats, polyols, xylitol, and glycerol. Below, film and coating production is described in different non-limiting examples. The term equal amount used below in the examples means that there was a 1:1 ratio based on dry weight between the wood hydrolysate and the co-component.

Preparation of Barrier Product

Film Preparation

Example 2A

A Blending Strategy, Chitosan

A retentate of each wood hydrolysate had been obtained according to Examples 1A-1B above and thereafter freeze dried. As a first step the freeze-dried hydrolysate was dissolved in water to get a hydrolysate water solution. An equal amount of chitosan, in this example from crab shell, average molecular weight of 150000 g/mol, was dissolved in water. 1%, v/v, i.e. volume percentage, of acetic acid was added to the chitosan water solution to facilitate dissolving. The chitosan-acetic acid water solution was thereafter added to the hydrolysate water solution. The concentration of the resultant water solution was 0.03 g/ml. The resultant water solution was homogenized, by intense stirring at slightly elevated temperatures, 40-50° C. The water solution was thereafter cast in flat Petri dishes with a diameter of 10 cm. The water was allowed to slowly evaporate at room temperature until it was completely dry, producing thin, dry films that were manually removed from the Petri dishes.

Example 2B

A Blending Strategy, CMC

A retentate of each wood hydrolysate had been obtained according to Examples 1A-1D above and thereafter freeze dried. The freeze-dried hydrolysate was first dissolved in water to get a hydrolysate water solution. An equal amount of CMC, medium viscosity of 400-1000 mPa·s, was dissolved in water and then added to the hydrolysate water solution. The concentration of the resultant water solution was 0.03 g/ml. The resultant water solution was homogenized by intense stirring. The water solution was thereafter cast in flat Petri dishes with a diameter of 10 cm. The water was allowed to slowly evaporate at room temperature until it was completely dry, producing thin, dry films which were manually removed from the Petri dishes.

Example 2C

A Blending Strategy, MFC

A retentate of wood hydrolysate had been obtained according to Example 1A above and thereafter freeze dried. The freeze-dried hydrolysate was first dissolved in water as described above. An equal amount of MFC, i.e. microfibrillated cellulose, 2% w/w, weight to weight percentage, in water suspension, was added to the hydrolysate water solution. The concentration of the resultant water solution was 0.03 g/ml. The resultant water solution was homogenized by intense stirring. The water solution was thereafter cast in flat Petri dishes with a diameter of 10 cm. The water was allowed to slowly evaporate at room temperature until it was completely dry, producing thin, dry films that were manually removed from the Petri dishes.

Example 2D

A Blending Strategy, MFC

A retentate of wood hydrolysate had been obtained according to Example 1B above and thereafter freeze dried. The freeze-dried hydrolysate was first dissolved in water as described above. An equal amount of MFC 2% w/w in water suspension, was added to the hydrolysate water solution. The concentration of the resultant water solution was 0.03 g/ml. The resultant water solution was homogenized by intense stirring. The water solution was thereafter cast in flat Petri dishes with a diameter of 10 cm. The water was allowed to slowly evaporate at room temperature until it was completely dry, producing thin, dry films that were manually removed from the Petri dishes.

Example 2E

Secondary Forces

A retentate of wood hydrolysate had been obtained according to Example 1A above and thereafter freeze dried. The freeze-dried hydrolysate was first dissolved in water as described above. An equal amount of alginate was added. The concentration of the resultant water solution was 0.05 g/ml.

Example 2F

Modification of Hydrolysate Components

The poly- and oligosaccharides in the hydrolysate carry plenty of pendant hydroxyl groups which may be covalently modified in organic coupling reactions. A retentate of wood hydrolysate was obtained according to Example 1A above and thereafter freeze dried. This hydrolysate was dissolved in water to get a hydrolysate water solution and L-lactic acid was added in excess. EDC, i.e. 1-ethyl-3-(3-dimethylaminopropyl)carbodiimide hydrochloride, was added and the mixture was heated to 45° C. and kept at this temperature for 24 h under continuous stirring. The water solution was allowed to cool and then drop-wise poured over methanol separating EDC and any unreacted lactic acid from the insoluble hydrolysate macromolecules. The beige precipitate was isolated by centrifugation, re-dissolved in water and re-precipitated in methanol. Finally, the precipitate was dried in vacuum. The supernatant was concentrated on a rotavapor and assessed with $^1$H-NMR to verify the structures of species separated from the product. The dry product was dissolved in water to a concentration of 0.07 g/ml and was cast on a glass Petri dish. The water was then allowed to evaporate at room temperature until the film was dry and could be peeled of the glass mould.

Example 2G

Modification of Hydrolysate Components

Prepared as described in Example 2F, but with D,L-lactic acid.

Preparation of Barrier Product

Coating Preparation

Example 3A

A retentate of each wood hydrolysate had been obtained according to Example 1A and 1C above and thereafter freeze dried. The freeze-dried hydrolysate was first dissolved in water to get a hydrolysate water solution. An equal amount of CMC, medium viscosity of 400-1000 mPa·s, was dissolved in water and then added to the hydrolysate water solution. The concentration of the resultant water solution was 0.03 g/ml. The resultant water solution was homogenized by intense stirring. The water solution was thereafter applied in a homogeneously thin layer onto a 38 μm thick film of PET, i.e. polyethylene-terephtalate. The water was allowed to slowly evaporate at room temperature until completely dry.

Example 3B

Like Example 3A but using an equal amount of MFC, 2% w/w, in water suspension instead of the CMC.

Example 3C

A retentate of each wood hydrolysate had been obtained according to Examples 1A-1D above and thereafter freeze dried. The freeze-dried hydrolysate was first dissolved in water to get a hydrolysate water solution. An equal amount of chitosan, from crab shell, average molecular weight of 150000 g/mol, was dissolved in water and then added to the hydrolysate water solution. The concentration of the resultant water solution was 0.03 g/ml. The resultant water solution was homogenized by intense stirring. The water solution was thereafter applied in a homogeneously thin layer onto a 38 μm thick film of PET. The water was allowed to slowly evaporate at room temperature until completely dry.

Table 2 below discloses the oxygen permeability of materials that are suitable as barrier films according to the present invention, Films 1-6 and Coating 1-3. The table also lists some reference materials, Ref 1 to 5, based on pure polysaccharides; the hemicellulose AcGGM, i.e. O-acetylated galactoglucomannan. Ref 3 to 5 would function as a barrier material at 50% RH, but show inadequate barrier properties at 80% RH. The films and the coatings produced according to the present invention, however, also function adequately at 80% RH. The thicknesses for the coatings in Table 2 are given for the coating alone, excluding the 38 μm thickness of the PET film. The abbreviation n.a. means data not available.

TABLE 2

| | | Oxygen permeability | | | |
|---|---|---|---|---|---|
| Sample | Wood hydrolysate from example | Co-component | Thickness (μm) | Oxygen permeability ($cm^3/(m^2$ 24 h)) at 50% RH | Oxygen permeability ($cm^3/(m^2$ 24 h)) at 80% RH |
| Film 1 | 1A | Chitosan | 25 | 45 | 44 |
| Film 2 | 1A | CMC | 30 | 1.0 | 20 |
| Film 3 | 1A | MFC | 40 | 1.5 | 48 |
| Film 4 | 1B | MFC | 40 | 1.6 | 51 |
| Film 5 | 1C | CMC | 35 | 0.9 | n.a. |
| Film 6 | 1D | CMC | 50 | 0.14 | n.a. |

TABLE 2-continued

Oxygen permeability

| Sample | Wood hydrolysate from example | Co-component | Thickness (μm) | Oxygen permeability (cm³/(m² 24 h)) at 50% RH | Oxygen permeability (cm³/(m² 24 h)) at 80% RH |
|---|---|---|---|---|---|
| Coating 1 | 1C | CMC | 7 | 0.96 | 2.8 |
| Coating 2 | 1A | MFC | 3 | 2.6 | 3.1 |
| Coating 3 | 1A | Chitosan | 3 | 2.5 | 2.9 |
| PET substrate film | — | — | 38 | 4.3 | 4.2 |
| Ref 1 | AcGGM, benzylated | — | n.a. | 130 | 170 |
| Ref 2 | AcGGM, benzylated | — | n.a. | 540 | 550 |
| Ref 3 | AcGGM | Polysaccharide | n.a. | 1.3 | High |
| Ref 4 | AcGGM | Polysaccharide | n.a. | 1.5 | High |
| Ref 5 | AcGGM | Glycerol | n.a. | 2 | High |

Figure 2:
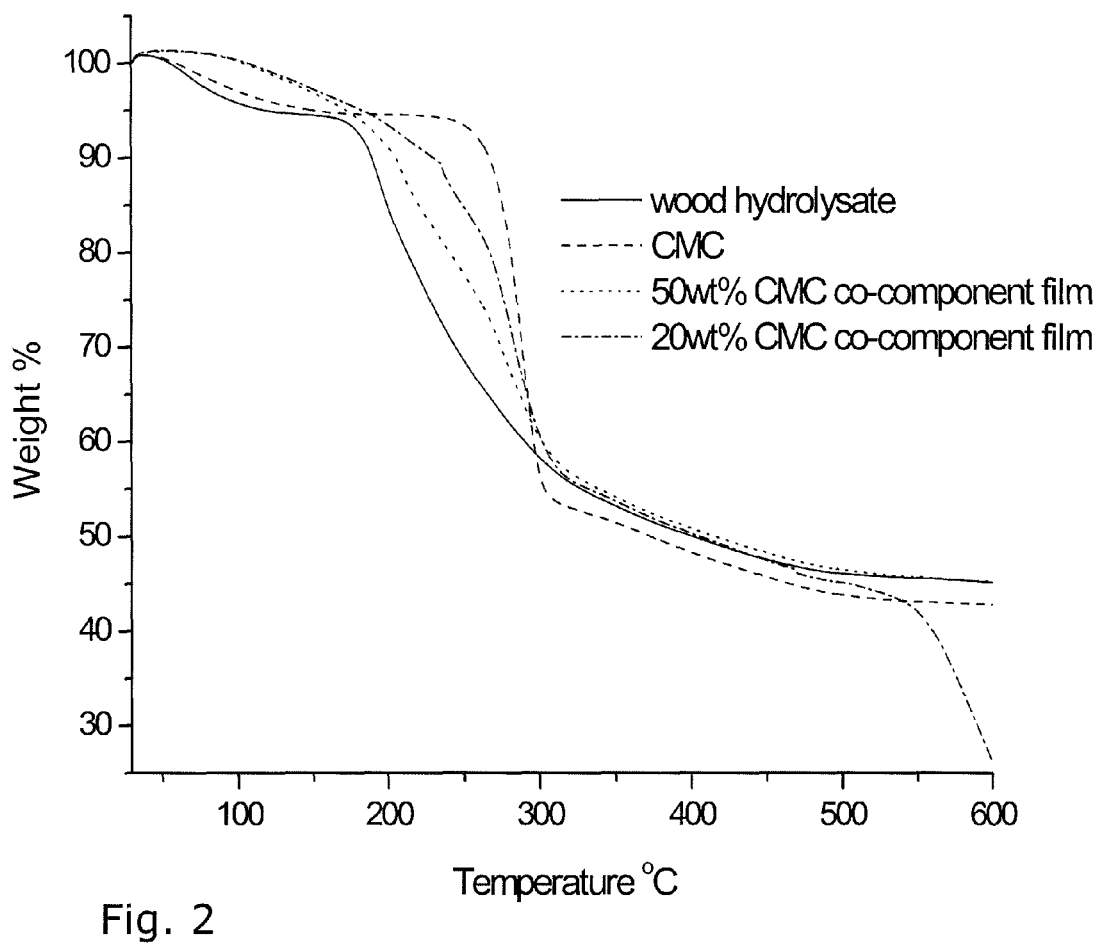
FIG. 2 is a thermogravimetric diagram for barrier layers according to the invention compared to the pure, individual components.

Thermogravimetric analysis, TGA, verifies and sustains the synergy effects of the primary and secondary intermolecular interactions in making the invented composition more stable than the components individually. A wood hydrolysate, obtained according to Example 1A was analyzed by TGA, as was pure CMC and films prepared according to Example 2B with either 50% or 20% w/w of the CMC component. Each sample was heated from 30 to 600° C. at a rate of 10° C./min in a $N_2(g)$ atmosphere. The thermal stability in terms of weight loss as a function of sample temperature was recorded and is depicted in FIG. 2. As shown in FIG. 2, the thermal stability is increased in the initial stage for the film formulations as compared to the pure, individual components suggesting that the integrity of the sample is supported by the purposely created intermolecular interactions between components.

The above examples describe a few examples how to obtain the cellulose-based hydrolysate. Further examples for making wood hydrolysates are described in PCT/EP2008/066148, but also other processes providing a fraction with high carbo-hydrate content but low cellulose content may be used. The fraction can be a process water, a fractionation product or similar. This fraction is upgraded in some way, for example according to above or with organic solvent fractionation, but also other methods may be used in order to separate some lignin and monomeric extractives, such as ash or sugar. The upgraded fraction shall contain oligo- and/or polysaccharides other than cellulose, typical hemicellulose, should contain lignin and may in addition contain monomeric sugar or extractives to a certain level. If the raw material for the hydrolysate lacks lignin, this may be added as an external additive.

The examples and embodiments are included in the description in order to explain the invention and are not in any way intended to limit the invention. For example, there are many more conceivable co-components than those mentioned herein. The invention is instead defined by the appended claims.

The invention claimed is:

1. A barrier layer for a packaging laminate, which barrier layer is made of a cellulose-based hydrolysate
wherein
said barrier layer comprises
ignin and oligo- or polysaccharides, said lignin and oligo- or polysaccharides being at least partly covalently bonded to each other in a matrix; and
at least one co-component;
wherein said at least one co-component is bonded to said lignin and oligo- or polysaccharides by primary and/or secondary bonds;
wherein said barrier layer has an oxygen permeability of less than 50 cm³/m²/24 h measured according to ASTM D3985-95 at an air humidity of 80% RH, 1 atm and a thickness less than 50 μm for said barrier layer.

2. The barrier layer according to claim 1, wherein said co-component is an oligomer or a polymer.

3. The barrier layer according to claim 1, wherein said co-component is a polysaccharide.

4. The barrier layer according to claim 1, wherein said barrier layer further comprises a plasticizer.

5. A packaging laminate for a packaging container for products being sensitive to oxygen, which packaging laminate comprises a base layer, a first outer layer on one side of the base layer and a second outer layer on the other side of the base layer, and a barrier layer adapted to serve as a gas barrier between the base layer and said first outer layer, wherein
said barrier layer comprises
lignin and oligo- or polysaccharides, said lignin and oligo- or polysaccharides being at least partly covalently bonded to each other in a matrix; and
at least one co-component;
wherein said at least one co-component is bonded to said lignin and oligo- or polysaccharides by primary and/or secondary bonds;
wherein said barrier layer has an oxygen permeability of less than 50 cm³/m²/24 h measured according to ASTM D3985-95 at an air humidity of 80% RH, 1 atm and a thickness less than 50 μm for said barrier layer.

6. The packaging laminate according to claim 5, wherein said base layer comprises a paper layer or a cardboard layer.

7. The packaging laminate according to claim 5, wherein said outer layers comprise polyolefin.

8. A package for oxygen sensitive products, which package is produced by folding and heat sealing of a sheet-shaped or web-shaped blank of a packaging laminate according to claim 5.

9. Method for manufacturing of the barrier layer according to claim 1, the method comprising:
providing a cellulose-based hydrolysate comprising lignin and oligo- or polysaccharides, wherein said lignin and oligo- or polysaccharides are at least partly covalently bonded to each other in a matrix;
adding at least one co-component;
bonding said at least one co-component by primary and/or secondary bonds to said lignin and oligo- or polysaccharides, such that said barrier layer has an oxygen permeability of less than 50 cm³/m²/24 h measured according to ASTM D3985-95 at an air humidity of 80% RH, 1 atm and a thickness less than 50 μm for said barrier layer.

10. The method according to claim 9, wherein said method for manufacturing said barrier layer also comprises evaluating the amount of lignin and oligo- or polysaccharides and/or the amount of and type of functional groups on the lignin and oligo- or polysaccharides in said provided cellulose-based hydrolysate and on the basis of said evaluation selecting an appropriate co-component.

11. The method according to claim 9, wherein at least a part of said primary and/or secondary bonds are obtained by organic coupling reactions.

12. The method according to claim 9, wherein the method comprises adding a plasticizer.

13. The package according to claim 8, wherein the package is for a foodstuff.

14. The barrier layer according to claim 1, wherein said co-component is selected from the group consisting of chitosan, micro-fibrillated cellulose, CMC, alginate and a combination thereof.

* * * * *